United States Patent

Agapiou et al.

[11] Patent Number: 5,173,014
[45] Date of Patent: Dec. 22, 1992

[54] FOUR FLUTE CENTER CUTTING DRILL

[75] Inventors: John S. Agapiou, Sterling Heights; Wayne Szostak, Warren, both of Mich.

[73] Assignee: General Motors Corporation, Detroit, Mich.

[21] Appl. No.: 832,513

[22] Filed: Feb. 7, 1992

[51] Int. Cl.$^5$ .............................................. B23B 51/02
[52] U.S. Cl. .................................... 408/59; 408/230
[58] Field of Search ................ 408/59, 223, 224, 227, 408/229, 230

[56] References Cited

U.S. PATENT DOCUMENTS

| 327,148 | 9/1885 | Faught | 408/229 |
| 1,022,135 | 4/1912 | Heinkel et al. | 408/230 |
| 4,137,002 | 1/1979 | Barket et al. | 408/59 |
| 4,645,389 | 2/1987 | Maier | 408/227 |

FOREIGN PATENT DOCUMENTS 854545  1/1940  France .

OTHER PUBLICATIONS

Machining Data Handbook, Metcut Res, 1980, pp. 19-5/19-7.
American Society of Mechamical Engineers–Twist DRills, 1979, p. 1.
Amer Mach–Whatever Happened to the Chisel Edge?, 1988, p. 51.
Exhibit A.
American Machinist, p. 52.

Primary Examiner—Daniel W. Howell
Attorney, Agent, or Firm—Patrick M. Griffin

[57] ABSTRACT

A twist drill with a novel cutting and configuration is provided that has the center cutting capability of a two flute drill combined with the stability and accuracy of a four flute drill. The drill has four flutes and four lands, but only to complete cutting edges. The two complete cutting edges are formed by two complete lead facets that run all the way to the center axis of the drill, thereby also forming two chisel edges. The other two cutting edges terminate short of the center axis of the drill, each stopping at an intermediate gash located to either side of the chisel edges. The intermediate gashes interconnect the chip removal gashes that serve the four cutting edges, joining them in two pairs. A coolant passage exits each intermediate gash, near the chisel edges. Thus, as the drill center cuts, the chisel edge chips have a clear exit path into the intermediate gash and then out to one of the other chip removal gashes. In addition, the interconnected gashes allow only two coolant passages to serve all four flutes. The extra cutting and stability provided by the two incomplete cutting edges and the four lands is provides without interference to the center cutting action provided by the chisel edges.

2 Claims, 4 Drawing Sheets

FOUR FLUTE CENTER CUTTING DRILL

This invention relates to drills in general, and specifically to a center cutting drill with four flutes.

BACKGROUND OF THE INVENTION

Drills may be broadly categorized as twist drills, that is, those in which the side flutes have a helical twist, and gun drills, in which the side flutes are straight. The twist drill-gun drill distinction is not relevant to differences in the cutting end of the drill, however, which is what the subject invention concerns. Therefore, only twist drills need be considered, which will be referred to simply as drills per se.

Drills may be further categorized as center cutting drills and non center cutting drills, also known as core drills. Non center cutting drills act to widen a smaller diameter pilot hole that has already been provided, generally by first drilling it with a smaller diameter, less accurate center cutting drill. Non center cutting drills can easily incorporate multiple flutes and their associated cutting edges, since the cutting edges need not be complete. That is, they need not run all the way in to the central axis of the drill, because the drill does not have or need a cutting point. Given the multiple flutes and the multiple lands between the flutes, non center cutting drills pilot in the holes that they are cutting with better stability, giving superior accuracy and straightness. Multiple pass drilling is inherently slower and more expensive than single pass drilling, of course.

Center cutting drills have two axial side flutes are separated by a pair of diametrically opposed lands. The center cutting point is not a true, sharp point, but a pair of short chisel edges that radiate out from the center axis to two cutting edges or lips, which are parallel to either side of a bisecting plane. The chisel edges are formed by the line of intersection of a lead facet on one side of the point, which creates the cutting edges, with a trailing clearance flank on the opposite side, which allows the cutting edges to clear the workpiece as they cut. The chisel edges, formed as they are, resemble the center ridge of a roof, and cannot be made sharp in the sense that the cutting edges of the drill can be made sharp. The chisel edge is also the most slowly moving part of the drill, being nearest to the center. This combination of inherent dullness and slow speed means that the chisel edges do not so much cut a chip as they plow up or extrude a chip ahead of them. This extruded workpiece material tends to build up in front of the chisel edge, wearing it more quickly than the faster moving and sharper main cutting edges.

In order to aid in chip formation and removal, each of the two flutes is provided with a ground trough known as a gash. These curl up the chips formed in front of the cutting edges, and help break them up and send them down the flutes and ultimately out of the hole. This process may be aided by a pair of coolant holes, one drilled through each land just ahead of the chip removal gash. Highly pressurized coolant pumped down the holes flushes the chips off the cutting edge and out. In a two flute drill, each chisel edge forms an obtuse angle with the cutting edge that precedes it, and has no overlap with it. Instead, each chisel edge lies totally behind the cutting edge that precedes it, next to a chip removal gash. This configuration provides an easy exit path for the material plowed up ahead of the chisel edge, which can flow down the clearance flank of the leading cutting edge and into the adjacent gash. Two flute drills are inherently less stable than a multiple flute drill, however, because there are fewer lands to ride inside the hole being drilled. Consequently, holes drilled with two flute, center cutting drills are generally less accurate.

While multiple flute drills are understood to be more stable and accurate than two flute drills, center cutting drills with more than two flutes are not known to exist commercially. In fact, in the twist drill art, the term two flute drill has become synonymous with center cutting drill, and the term three or four flute drill has become synonymous with core drill, for that very reason. While one might think that a workable center cutting drill with three or four flutes could simply be made as a multiplied, scaled up version of a two flute drill, with three or four complete cutting edges meeting somehow at the center, that is not the case. If that were attempted, the center point where the edges met would look like a three or four sided pyramid. The leading edge of each side of the pyramid would constitute a chisel edge. The chisel edges so formed would now form an acute angle with the cutting edges preceding them, and would not lie totally behind. In addition, the chisel edges would have very little overlap with any chip removal gash, and there would be no easy exit path for the chisel edge chips that were formed. The chisel edge chips formed would have to fight their way down the shallowly sloped lead facet of the preceding cutting edge, rather than down the more steeply sloped clearance flank, before they could reach the chip gash. Consequently, the chisel edge chips would tend to build up, the axial load tending to thrust the drill out of the hole would be large, and the wear rate of the chisel edges high. Experimentation has shown this.

SUMMARY OF THE INVENTION

The invention provides a four flute center cutting drill that has the stability and accuracy of a multiple flute drill, but the center cutting capability of a two flute drill.

In the embodiment disclosed, a cylindrical drill shaft has four axially extending side flutes, four lands, and four generally conical chip removal gashes machined into the flutes. Only two of the cutting edges are complete, that is, running to the center. Each complete cutting edge is formed by a complete planar lead facet that runs from the margin of the drill shaft all the way to the center axis of the drill. Each complete lead facet begins just ahead of a plane that bisects the drill shaft lengthwise, and is trailed by a more steeply sloped clearance flank. Where the complete lead facets and clearance flanks intersect, a pair of short chisel edges are formed, similar to those on a two flute drill. Offset to either side of the chisel edges, and generally parallel to the bisecting plane, are a pair of semi cylindrical intermediate gashes. Each intermediate gash is sloped slightly from the horizontal, tilted toward the chip removal gash that leads of each complete cutting edge, and connecting it to the chip removal gash that trails each complete cutting edge. Two identically shaped and oriented lead facets and clearance flanks run from the margin as far as the intermediate gashes, thereby creating a pair of incomplete cutting edges perpendicular to the complete cutting edges. In addition, in the embodiment disclosed, a pair of generally axially extending coolant holes exit the intermediate gashes, near the chisel edges.

In operation, the chisel edges cut the center of the workpiece hole as they would with a two flute drill. The workpiece material plowed up in front of the chisel edges has an easy and direct exit path down the clearance flank of a complete cutting edge, into the adjacent intermediate gash, and then down and back into the trailing chip removal gash. Chips are cut by both the complete and incomplete cutting edges independently of, and without interference from, the chisel edge chips. Once the drill has advanced far enough, all four lands enter the workpiece hole, giving the stability that a multi flute drill exhibits, while the center continues to be cut by the chisel edges. The coolant exiting the coolant holes reflects from the conical cutting interface the workpiece hole as the drill advances, and is distributed by the intermediate gashes evenly to both the leading and trailing chip removal gashes, helping to flush chips from both the chisel edges and the cutting edges and out the flutes. Hole accuracy is good, while drill life is dramatically improved.

It is, therefore, a general object of the invention to provide a center cutting drill that has the center cutting abilities of a two flute drill combined with the accuracy of a multi flute drill.

It is another object of the invention to provide such a drill that has four flutes and four lands, but only two complete cutting edges and chisel edges, bordered by two intermediate gashes that create two incomplete cutting edges, so that the chisel edges can cut the center without material build-up, while the two complete and two incomplete cutting edges cut without interference from the chisel edges and the four lands provide stability to the drill.

It is another object of the invention to provide such a drill in which coolant holes open into the intermediate gashes, which also cooperate to distribute the coolant from each hole to more than one flute.

DESCRIPTION OF THE PREFERRED EMBODIMENT

These and other objects and features of the invention will appear from the following written description, and from the drawings, in which.

Figure 1:
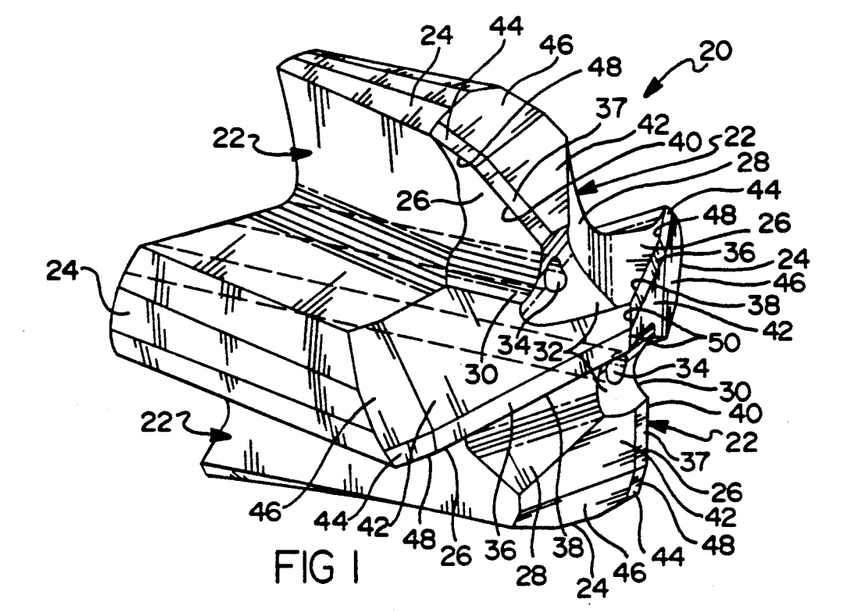
FIG. 1 is a perspective view of a preferred embodiment of the drill of the invention.
Figure 2:
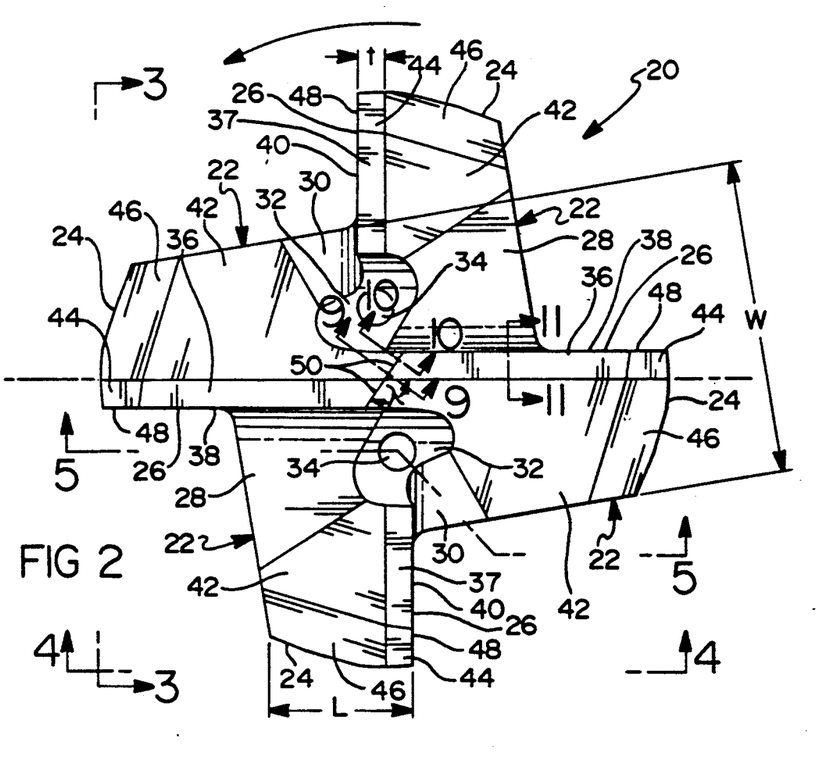
FIG. 2 is a plan view of the cutting end of the drill, looking down the central axis.

Referring first to FIGS. 1 and 2, a preferred embodiment of the drill of the invention is indicated generally at 20. Drill 20 is machined from what is originally a cylindrical tungsten carbide shaft, and has a diameter of 0.824 inches and a length of 3.5 inches. In fact, the portion of the drill 20 illustrated is a separate carbide shaft that is brazed onto a non illustrated steel shank, which is then attached to a boring machine. Material, diameter and length of the drill will be determined by the depth and diameter of the hole to be drilled, and the hardness of the material, of course. Here, the hole to be drilled is the lifter bore in a cast iron engine block, a relatively large and deep hole in a very hard material, and a hole that needs good accuracy. The entire length of drill 20 need not be shown to illustrate it, of course, as it is essentially the same all along its length, but for the non illustrated attachment end, which is conventional, and the cutting end, which is described in detail below. Drill 20 has only one direction of rotation about its center axis, which is predetermined by the rotation direction of the drilling machine. Rotation is counterclockwise from the perspective of FIG. 2, but is more logically described from the perspective of an operator looking in the opposite direction as clockwise, or right hand rotation.

Figure 3:
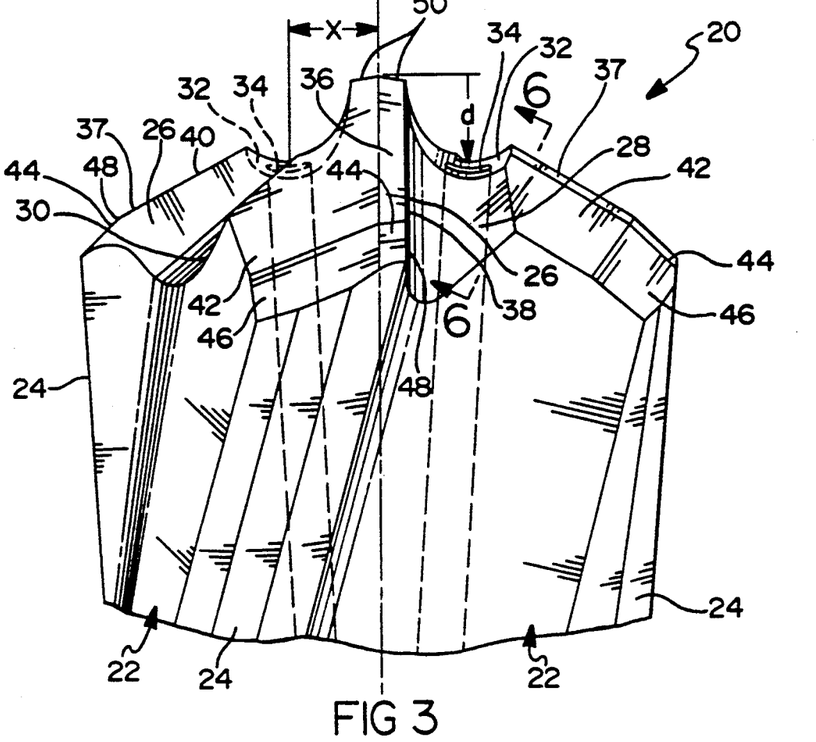
FIG. 3 is a side view of the drill from the perspective of line 3—3 of FIG. 2.
Figure 4:
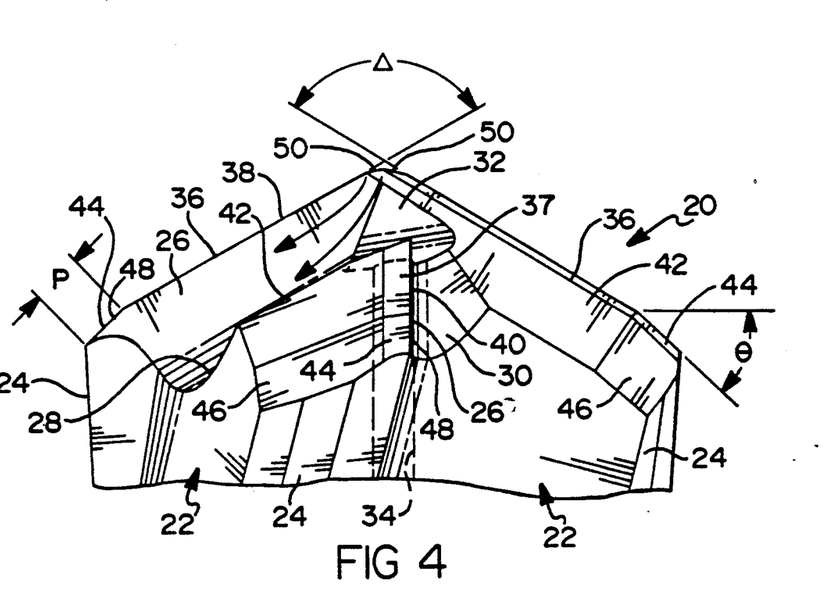
FIG. 4 is a side view of the drill from the perspective of line 4—4 of FIG. 3.
Figure 6:
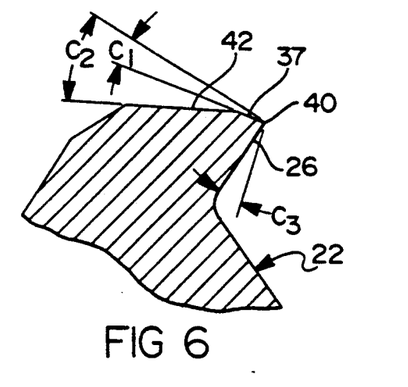
FIG. 6 is a sectional view of the cutting end of the drill taken along the line 6—6 of FIG. 3.

Referring next to FIGS. 2 through 4, and to FIG. 6, the first step in machining drill 20 from the cylindrical blank is to grind four evenly spaced, axially extending flutes 22, each of which runs the entire axial length. Generally, the total area of the flutes 22, as best seen in FIG. 2, constitutes about 40% of the total area, the rest being solid metal. This may be contrasted to a conventional two flute drill, in which the flute area may constitute some 60% of the total area. The size of the flutes 22 may be described in terms of the solid material left between them. The web width W between the trailing faces of the flutes 22 is 0.450 inches, and width L of a land 24 is 0.208 inches. The flutes 22 are not axially straight, but have a helical angle of 15 degrees, right hand. As a consequence, at the point where the leading faces 26 of the flutes 22 terminate, also known as the rake faces, they have a shallow angle $C_3$ relative to a plane that is parallel to the center axis of 5 degrees or less, best seen in FIG. 6. Here, "leading" is defined relative to the rotation direction of drill 20, shown by the arrow in FIG. 2. As also seen in FIG. 2, the rake faces 26 are offset to opposite sides of, and parallel to, a lengthwise bisecting plane of drill 20, leading it by a thickness t of 0.040 inches. While there are an infinite number of planes bisecting drill 20 lengthwise, the one shown in FIG. 2 by dot dash line is hereafter referred to as the bisecting plane. The shape and size of the lands 24 are important to the successful operation of drill 20, though they are not the crux of the invention. The lands 24 are basically semi cylindrical, although they are machined here with three parallel and flat facets, so that they approach, but do not lie directly on, a perfect cylinder. This is done simply for ease of machining, and the lands 24 can be considered semi cylindrical as a practical matter. Four lands are inherently stiffer than two and, just as important, are more symmetric. That is, the stiffness in one direction and in the direction 90 degrees away will vary far less than in a two flute configuration.

Referring next to FIGS. 2 through 6, the shape of the cutting end of drill 20 is illustrated. Once the four flutes 22 and four lands 24 have been ground, the next step is to grind a very particular pattern of gashes, two sets of three gashes each. Two of each set of three are chip removal gashes of the general type described above. Two primary chip removal gashes 28 slope radially outwardly and axially downwardly into two diametrically opposed flutes 22. The primary gashes 28 are generally trough shaped, and are ground with a wheel that is flat on one side and sloped sloped on the other, with a generally semi circular edge. This is the type of wheel generally used to gash a drill, as is well known to those skilled in the art. The shape of the primary gash 28 produced is best seen in FIG. 3. The exact dimensions are not as important as the general orientation and location. Here, the flat side of primary gash 28 is tangent to the rake face 26, and the angle $\alpha$ at which it slopes out into flute 22, measured relative to a line normal to the central axis, is approximately 50 degrees. Two similarly shaped and ground secondary chip removal gashes 30 slope radially outwardly and axially downwardly into the other two flutes 22, at an angle $\beta$ of 40 degrees, tangent to the other two rake faces 26. Their shape is best seen in FIG. 4. While the chip removal gashes 28 and 30 considered alone are basically conventional in shape, they are novel in the manner in which they are combined into a center cutting drill, as is described next.

Figure 5:
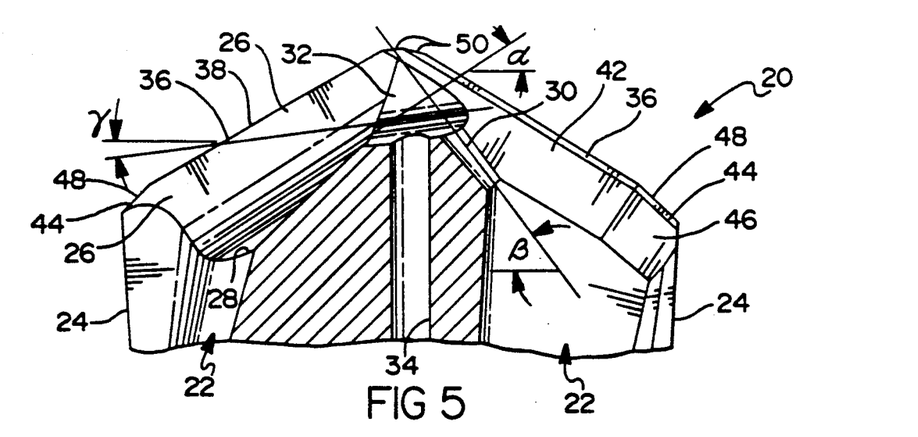
FIG. 5 is an axial section of the drill shaft taken along the line 5—5 of FIG. 2.

Referring next to FIGS. 2, 3 and 5, each pair of gashes 28 and 30 is interconnected by a trough shaped intermediate gash 32, each of which is generally parallel to the bisecting plane of drill 20, shown by the dot dash line in FIG. 2. Each intermediate gash 32 is generally semi cylindrical, with a radius in the range of approximately 0.080 to 0.090 inches, ground down to a depth d at the of center approximately 0.150 inches below the tip of drill 20. Each intermediate gash 32 is located such that, when ground, it is generally tangent to the same two rake faces 26 to which the two primary chip removal gashes 28 are tangent. Again, the exact dimensions of intermediate gash 32 are not so important as its general orientation, the fact that they interconnect the respective pairs of primary chip removal gashes 28 and 30, and the fact that each is sloped or tilted slightly from the secondary gash 30 toward the primary gash 28. By tilted "toward", it is means that a line down the bottom of the trough created by intermediate gash 32 is not parallel to a plane that is perpendicular to the center axis of drill 20, but instead has a shallow angle $\gamma$ relative to such a plane of 7 to 10 degrees. Another way to conceptualize the orientation is to imagine an object resting in intermediate gash 32. The direction of rotation is such that it would tend to move it relatively toward the primary gash 28, a bias that is assisted, in effect, by the slope. A pair of coolant passages 34 extend axially through the length of drill 20 at a slight angle of approximately 3 degrees and exit at the bottom center of the intermediate gashes 32, at a distance x of approximately 0.125 inches from the central axis of drill 20. The diameter of each coolant passage 34 is 0.062 inches. The exit hole, as seen in FIG. 2, is slightly elliptical, given the tilt angle $\gamma$. In the drill 20, the coolant passages 34, sited as they are, can work far more effectively than if they were conventionally sited, as is described further below.

Referring next to FIG. 2 through 4, the surfaces that make up the rest of the cutting end of drill 20 are illustrated. A planar lead facet is ground adjacent to each rake face 26. These comprise two complete lead facets 36, which extend from the bisecting plane to a respective primary gash 28, (specifically to the rake face 26 thereof) and two incomplete lead facets 37, which extend from a plane perpendicular to the bisecting plane to a secondary gash 30. The two complete lead facets 36 create a pair of complete cutting edges 38, often called cutting lips. The two incomplete lead facets 37 create a pair of incomplete cutting edges 40, because they terminate at the intermediate gashes 32. The location of each lead facet 36 or 37 in space is determined by two parameters. One is the angle that the cutting edge 38 (or 40) makes with the central axis of the drill, which is 60 degrees here. This is most often expressed as the angle $\Delta$ that the complete cutting edges 38 make with one another, as shown in FIG. 4, which is, of course, simply twice the angle that they make with the center axis, or 120 degrees. Another way to define the same orientation is to say that the edges 38 (or 40) make a 30 degree angle with a line perpendicular to the axis of drill 20.

Referring next to FIGS. 2 and 6, the other parameter that sets the lead facets 36 and 37 in space is the clearance angle $C_1$, shown in FIG. 6, which is more difficult to describe. Looking at FIG. 2, imagine a plane that is perpendicular to the bisecting plane and which also makes a 60 degree angle with the central axis of the drill 20, and contains the cutting edge 38 or 40. That is the reference plane represented by the dotted line, and the relevant angle $C_1$ is contained between it and the plane of the lead facet 36. $C_1$ is in the range of 9–11 degrees. The clearance angle $C_1$ of facets 36 and 37, in conjunction with the slight undercut of the rake faces 26 preceding them, is what makes the cutting edges 38 and 40 literally sharp, that is, less than 90 degrees in cross section. As a matter of good design practice, the lead facets 36 and 37 will be ground with the shallowest clearance angle possible that will still provide sufficient sharpness, since excess sharpness weakens the cutting edge. Trailing each lead facet 36 and 37 is a planar clearance flank 42, which has an even greater clearance angle $C_2$ of 26–27 degrees, measured similarly to $C_1$. In the embodiment disclosed, each lead facet 36 and 37 and clearance flank 42 terminates in a chamfer or corner break, a lead corner break 44 and a trailing corner break 46 respectively, each of which has an angle $\theta$ of 45 degrees, as compared to the more shallow 30 degree angle of the cutting edges 38 and 40. Where the four lead corner breaks 44 intersect the flute rake faces 26, four shorter peripheral cutting edges 48 are created. The lead corner breaks are ground large enough that the peripheral cutting edges 48 are approximately 0.060 inches long. The objective of the corner breaks 44 and 46 is to make the drill 20 more stable as it breaks through a cross hole. However, the more significant contributor to stability is the existence of the four lands 24, and the way that the drill 20 is allowed to center cut successfully in spite of the multiple lands 24.

Referring next to FIGS. 2, 4 and 5, the configuration of the portion of drill 20 that does the actual center cutting is described. Two of the clearance flanks 42 are each diametrically opposed to a complete lead facet 36. Where they intersect, a pair of short chisel edges 50 are formed, which radiate out from the center axis to the two rake faces 26 that are adjacent to a primary gash 30. Similar to the chisel edge of a standard two flute, twist drill, each chisel edge 50 is swept back from each complete cutting edge 38, forming an obtuse chisel edge angle λ of 120 degrees. Technically, the angle that each chisel edge 50 forms is measured relative to the bisecting plane, not directly with the complete cutting edge 38, but since the cutting edge 38 is parallel to the bisecting plane, the angle formed is the same. The relation of either chisel edge 50 to the other surfaces is best seen in FIG. 5. The active side of each chisel edge 50, the side that would actually "see" or contact the workpiece surface as drill 20 turns, is adjacent to a clearance flank 42, which leads it in terms of the direction of rotation. The innermost portion of chisel edge 50 is also adjacent to an intermediate gash 32, which in turn is tipped back into a primary gash 28. The outermost portion of chisel edge 50 is also adjacent to the rake face 26 that is adjacent to primary gash 28.

Figure 7:
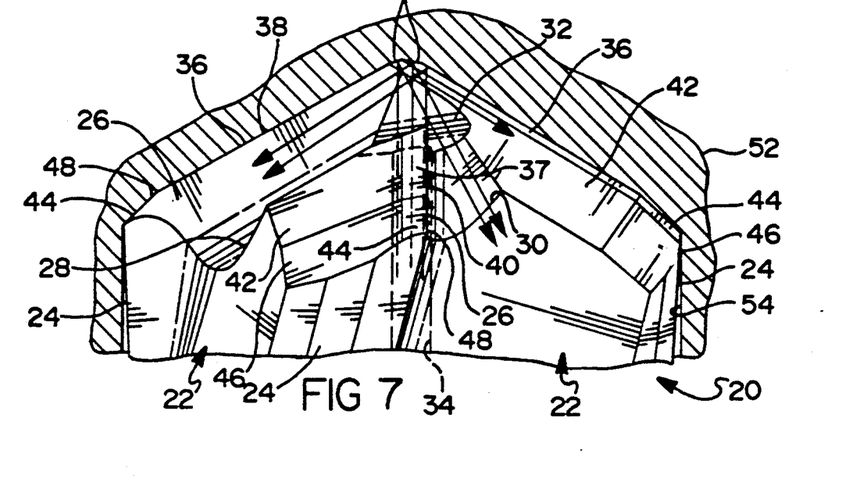
FIG. 7 is a view of the cutting end of the drill in a workpiece hole, showing the flow of coolant.
Figure 8:
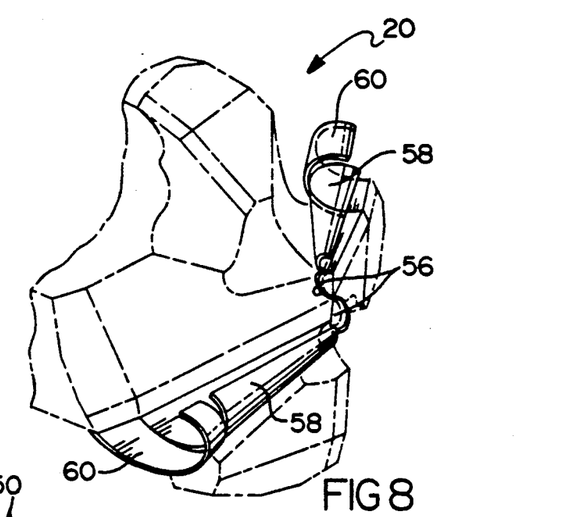
FIG. 8 is a perspective view of the chips formed by the complete cutting edges and the chisel edges.
Figure 9:
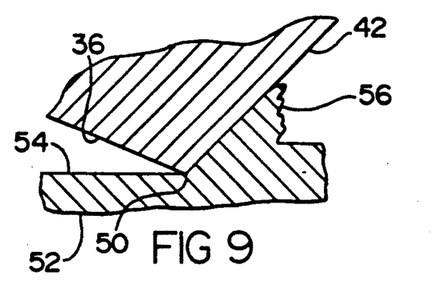
FIG. 9 is a cross section of a chisel edge and the accompanying chip taken along the line 9—9 of FIG. 2.
Figure 10:
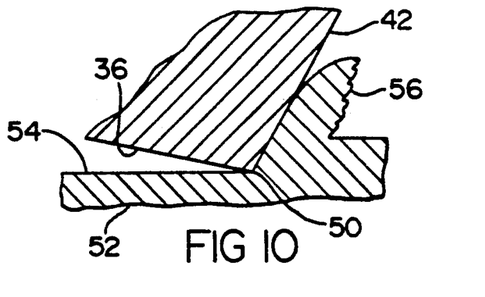
FIG. 10 is a cross section of a chisel edge and the accompanying chip taken along the line 10—10 of FIG. 2.

Referring next to FIGS. 2, 5 and 7, it may be seen how the chisel edges 50 and the coolant passages 34 can have a unique relative location. In a two flute, center cutting drill, the lands are relatively wide, there being only two, so there is ample room in which to drill a coolant passage through each land. However, the coolant passages cannot be placed too near the center axis of the drill, or they could interfere with and weaken the chisel edges. With a multi flute core drill, the lands grow proportionately thinner, and the task becomes more difficult, especially when the flutes and lands have a helical twist. With a hypothetical, multi flute center cutting drill, it would be even more difficult to site the coolant passages close to the center of the drill, as even more weakening of the chisel edges would occur. Here, the configuration of the chisel edges 50 and their relation to the intermediate gashes 32 provides a unique opportunity to service the four cutting edges 38 and 40, and the two chisel edges 50, with only two coolant passages 34. Each coolant passage is located close to the the center axis of drill 20, and close to the chisel edges 50. However, since the coolant passages 34 break through near the bottom center of the intermediate gashes 32, they do not interfere with or weaken any edge or point. This location of the coolant passages 34 allows them to operate in a particularly efficient manner.

Figure 11:
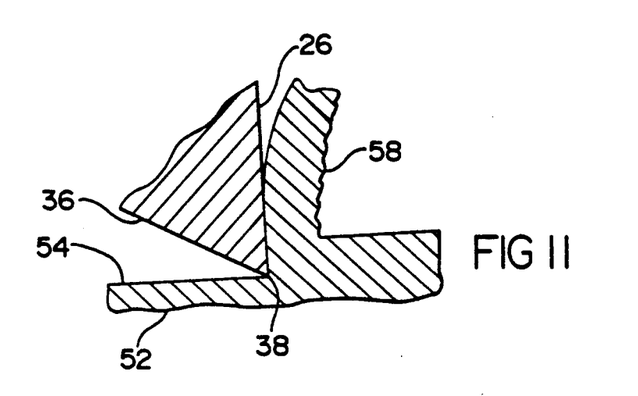
FIG. 11 is a cross section of a chisel edge and the accompanying chip taken along the line 11—11 of FIG. 2.

Referring next to FIG. 2 and to FIGS. 7 through 13, the operation of drill 20 is illustrated. When drill 20 first engages a workpiece 52, the chisel edges 50 are the first to begin to work to produce a hole 54. Each chisel edge 50 plows up and extrudes a wave of material before it, as noted above, which can be conveniently referred to as a chisel edge chip 56, though it is not a chip in the usual sense. After the drill 20 has advanced a short distance, the innermost portions of the two complete cutting edges 38 begin to engage the workpiece 52, and a conical depression begins to form in its surface. The complete cutting edges 38 are sharp, as seen in FIG. 11, and cut a true chip 58 that curls and breaks. Not much of the drill 20 is yet in contact, so it is not yet completely stabilized. However, it does self center and hold position as well as a conventional two flute drill as it starts. With further axial advancement, the two incomplete cutting edges 40 begin to contact, cutting a chip that is like that formed on complete cutting edge 38, and which is not separately illustrated. With yet further advancement, the four peripheral cutting edges 48 begin to cut, forming chips 60 that are like chips 58, but which break away therefrom, because of the greater angle of the corner break 44. Finally, that portion of the lands 24 nearest the end, sometimes referred to as the margins, enter the hole 54 formed by the various cutting edges. At that point, the full stability capable from a four flute drill is achieved, as the lands 24 pilot on the cylindrical inside surface of hole 54. Four lands spaced 90 degrees apart provide a much more rigorous guidance than two spaced 180 degrees. The various cutting edges continue to work, advancing the hole 54 in depth.

The results that have been achieved in practice, which are nothing short of remarkable. Conventional drills, working in steel or iron to produce holes of approximately two inch depth, and with feed rates in the range of 9–14 inches per minute and cutting speeds of around 200 SFM, are expected to have a tool life of significantly less than 2,000 holes, on average. The subject drill, working in cast iron at comparable rates, has regularly lasted for well over 20,000 holes, over ten times better, while exhibiting almost no visible wear. Actual experience with a conventional drill drilling the same lifter bore hole that the subject drill produces yielded at best a tool life of approximately 4,000 holes. Tool life of this surprising magnitude would indicate a very efficient chip formation and removal action, which is exactly what has been observed. The chips exiting the flutes 22 have been relatively small and fine, and no slug has formed ahead of the drill 20 as it cuts. A slug is especially a problem when the hole opens into inaccessible inner volumes, such as the cross hole in a lifter bore. It has also been observed that pressurized coolant exits the hole 54 through the flutes 22 evenly, which is critical to chip removal from, and cooling and lubrication of, the cutting interface.

Figures 12, 13:
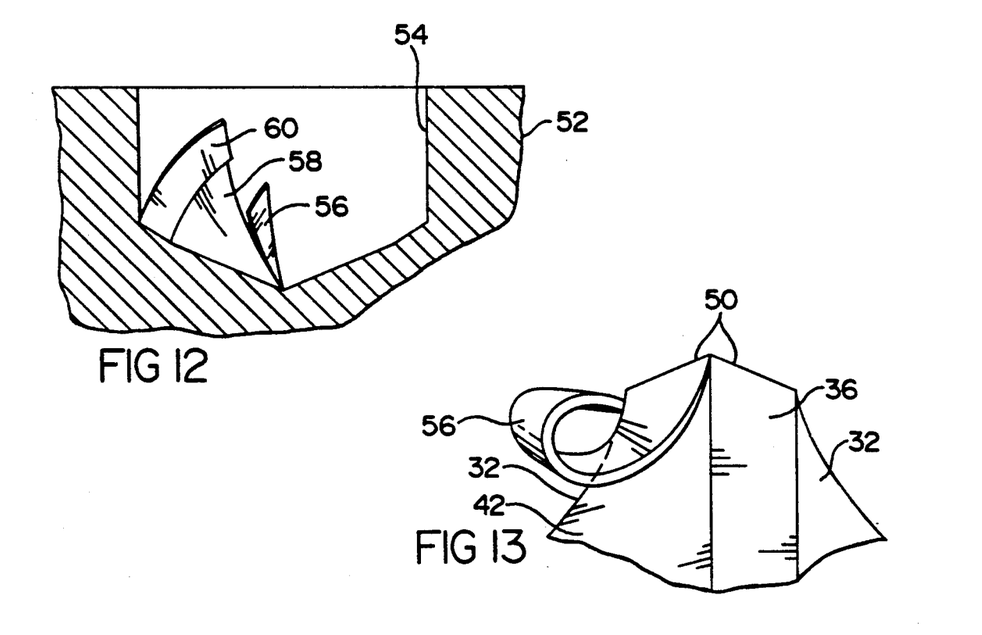
FIG. 12 is a view of the chips formed by one chisel edge and complete cutting edge at the cutting interface.
FIG. 13 is an enlargement of just the chisel edges and the portion of the lead facet and clearance flank nearest them, from the same perspective as FIG. 3, and showing the chip formed ahead of one chisel edge.

Still referring to FIGS. 7 through 13, the explanations for the superior results are several. The particular relation of the chisel edges 50 and the complete and incomplete cutting edges 38 and 40 allows them to operate without mutual interference. Since the incomplete cutting edges 40 terminate significantly short of the chisel edges 50 and the innermost portion of the complete cutting edges 38, the chips that they cut, though not separately illustrated, will not interfere. Instead, they will be curled up by the respective rake faces 26, sliding down the secondary chip removal gashes 30 and ultimately down two of the flutes 22. The chisel edge chips 56, if they have no easy exit path, have the most potential to denigrate drill performance. Here, however, they have a clear exit path. Nearer the central axis, the chisel edge chip 56 can flow down the clearance flank 42, down the side of intermediate gash 32, and down the bottom of the tilted intermediate gash 32 into primary gash 28, as shown by the inner arrow in FIG. 4. Farther from the center axis, the chisel edge chip 56 has a more direct path, down the clearance flank 42, the rake face 26, and then into the primary gash 28, as shown by the outer arrow in FIG. 4. Flow of the chisel edge chip 56 is also illustrated in FIG. 13. In a two flute drill, there is no land adjacent the chisel edge to block chip removal, just a large flute. Here, there is a land 24 next to each chisel edge 50, but the presence of the intermediate gash 32 to either side of the chisel edges 50 prevents blockage and build-up. The intermediate gashes 32 also prevent the chips formed by the incomplete cutting edges 40 from interfering, since they would not touch or reach the center of drill 20. In addition, the presence of the more steeply slope peripheral cutting edges 48 allows the chips 60 to break away from the chips 58, which contributes to chip dispersal and removal.

Referring to FIG. 7, another mechanism that aids significantly in the chip removal process is the flushing action provided by the coolant passages 34. Because they exit the end of drill 20 in and through the intermediate gashes 32, and very near the center axis of drill 20, the coolant forced through the passages 34 under high pressure can reflect off of the conical cutting interface of the hole 54, radiating out in a conical pattern itself. The chisel edge chips 56 are efficiently flushed out, since the passages 34 can open exit so close to them, which would not be possible with a conventional drill, as explained above. In addition, the since the intermediate gashes 32 interconnect the primary and secondary gash 28 and 30 right at the point of coolant exit, they act to feed and distribute coolant more or less evenly to each. Thus, only two coolant passages 34 can serve four flutes 22. In effect, the intermediate gashes 32 and the primary and secondary gashes 28 and 30 form a bi directional, compound sluice, allowing all the chips 56, 58 and 60 to be flushed down the various edges that the chip gashes 28 and 30 serve. The flushed chips and coolant then are forced out of the hole 54 through the flutes 22.

In conclusion, the invention provides a novel configuration shape that not only center cuts as well as a two flute drill and provides the stability of a multi flute drill, but which works far better overall in true synergistic fashion. Variations in the embodiment disclosed could be made. Only those clearance flanks that are adjacent to complete lead facets need be absolutely planar and flat, as it is those two that create the chisel edges. The other two clearance flanks could be machined to any shape that provides enough clearance. The corner breaks 44 and 46 could be eliminated in an application where the hole to be drilled would not pass through a cross hole. They do, however, help to break up the chips that are formed. Variations in the various angles noted above could be made, again, so long as the basic configuration is maintained. Although it would never be done in a high speed, high volume plant environment, the coolant passages 34 could be eliminated if the drill were only to be used for fairly light duty, such as household tasks. Two flute centering with multi flute stability would still be achieved. Therefore, it will be understood that it is not intended to limit the invention to just the embodiment disclosed.

The embodiments of the invention in which an exclusive property or privilege is claimed are defined as follows:

1. A generally cylindrical, center cutting drill for drilling a hole in a workpiece including a cutting end with a center axis and operating with a predetermined direction of rotation about said axis, said drill comprising,     four evenly spaced, axially extending side flutes in said drill shaft, each opening through said cutting end at a planar rake face, two of said rake faces being generally parallel to and offset to opposite sides of a plane that bisects said drill shaft lengthwise, said four flutes thereby producing four evenly spaced lands between each adjacent pair of flutes,     a chip removal gash machined into each flute at said drill shaft cutting end generally tangent to a rake face and sloped radially outwardly and axially away from said center axis,     a pair of generally semi cylindrical intermediate gashes in said cutting end offset to either side of said bisecting plane and sloped slightly toward the chip removal gashes that are tangent to said two rake faces,     four planar lead facets on said cutting end, each adjacent to a rake face, including two complete lead facets extending from said bisecting plane to a respective adjacent rake face and two incomplete lead facets extending from a plane normal to said bisecting plane to a respective rake face, thereby creating a pair of complete cutting edges and a pair of incomplete cutting edges at the intersection with said rake faces,     a pair of planar clearance flanks, each extending from said bisecting plane to a respective side flute, each being adjacent to one complete lead facet and opposed to the other complete lead facet so as to intersect with said opposed lead facet and thereby create a pair of chisel edges, each of which is adjacent to a respective intermediate gash,     whereby, said chisel edges and complete cutting edges can center cut a hole in said workpiece as said four lands simultaneously pilot inside said hole, while the chips formed by said chisel edges flow into an adjacent intermediate gash and then into a chip removal gash, thereby preventing said chisel edge chips from building up in front of said chisel edges or interfering with chips formed by said incomplete cutting edges.

2. A generally cylindrical, center cutting drill for drilling a hole in a workpiece including a cutting end with a center axis and operating with a predetermined direction of rotation about said axis, said drill comprising,     four evenly spaced, axially extending side flutes in said drill shaft, each opening through said cutting end at a planar rake face, two of said rake faces being generally parallel to and offset to opposite sides of a plane that bisects said drill shaft lengthwise, said four flutes thereby producing four evenly spaced lands between each adjacent pair of flutes,     a chip removal gash machined into each flute at said drill shaft cutting end generally tangent to a rake face and sloped radially outwardly and axially away from said center axis,     a pair of generally semi cylindrical intermediate gashes in said cutting end offset to either side of said bisecting plane and sloped slightly toward the chip removal gashes that are tangent to said two rake faces, thereby interconnecting said chip removal gashes in two pairs,     four planar lead facets on said cutting end, each adjacent to a rake face, including two complete lead facets extending from said bisecting plane to a respective adjacent rake face and two incomplete lead facets extending from a plane normal to said bisecting plane to a respective rake face, thereby creating a pair of complete cutting edges and a pair of incomplete cutting edges at the intersection with said rake faces,     a pair of planar clearance flanks, each extending from said bisecting plane to a respective side flute, each being adjacent to one complete lead facet and opposed to the other complete lead facet so as to intersect with said opposed lead facet and thereby create a pair of chisel edges, each of which is adjacent to a respective intermediate gash, and, a pair of coolant holes through which pressurized coolant is supplied, each opening into a respective intermediate gash proximate said chisel edges, whereby, said chisel edges and complete cutting edges can center cut a hole in said workpiece as said four lands simultaneously pilot inside said hole, while pressurized coolant is distributed to said chisel edges and to said interconnected pairs of chip removal gashes to flush the chips formed by said chisel edges into an adjacent intermediate gash and then into a chip removal gash, thereby preventing said chisel edge chips from building up in front of said chisel edges or interfering with chips formed by said incomplete cutting edges.

* * * * *